United States Patent [19]

Dreyer

[11] Patent Number: 4,601,824
[45] Date of Patent: Jul. 22, 1986

[54] FLAT-MEMBRANE SEPARATING ARRANGEMENT

[75] Inventor: Siegfried Dreyer, Magdeburg, German Democratic Rep.

[73] Assignee: Veb Chemieanlagenbaukombinat Leipzig-Grimma, Grimma, German Democratic Rep.

[21] Appl. No.: 503,723

[22] Filed: Jun. 13, 1983

Related U.S. Application Data

[63] Continuation-in-part of Ser. No. 451,543, Dec. 21, 1982, abandoned.

[30] Foreign Application Priority Data

Dec. 24, 1981 [DD] German Democratic Rep. ... 236272

[51] Int. Cl.$^4$ ............................................. B01D 13/00
[52] U.S. Cl. ..................................... 210/232; 210/336; 210/433.2; 210/456
[58] Field of Search ..................... 210/347, 336, 321.1, 210/232, 486, 456, 433.2

[56] References Cited

U.S. PATENT DOCUMENTS

| | | | |
|---|---|---|---|
| 3,033,373 | 5/1962 | Mueller | 210/347 X |
| 4,036,759 | 7/1977 | Donovan | 210/336 X |
| 4,136,029 | 1/1979 | Cosack et al. | 210/456 X |

FOREIGN PATENT DOCUMENTS 2332043  6/1977  France ............................... 210/336

Primary Examiner—Frank Spear
Attorney, Agent, or Firm—Michael J. Striker

[57] ABSTRACT

A flat-membrane separating arrangement has a plurality of separating blocks each having a packet of ring-shaped membrane-coated filter disks spaced from one another in an axial direction to form therebetween intermediate gaps which are open peripherally, assembling elements arranged to assemble the filter disks in the packet and including a plurality of spacing rings located between the filter disks and tensioning and permeate-guiding pins connecting the filter disks with one another, supplying elements for supplying raw solution or concentrate flow upstream of the packet of filter disks and including a plurality of curved guiding blades with a deflecting disk having a central projection at the side of the packet and with a first limiting member at the side opposite the packet, permeate-withdrawing elements including a second limiting member connected with the packet downstream of the latter and provided with a central opening for permeate withdrawal, and an annular wall extending along the supplying elements, the packets, and the withdrawing elements, and peripherally spaced from the filter disks so as to form a peripheral annular gap communicating with the intermediate gap, wherein the blocks are releasably connectable with one another so as to assemble a multi-block arrangement.

9 Claims, 6 Drawing Figures

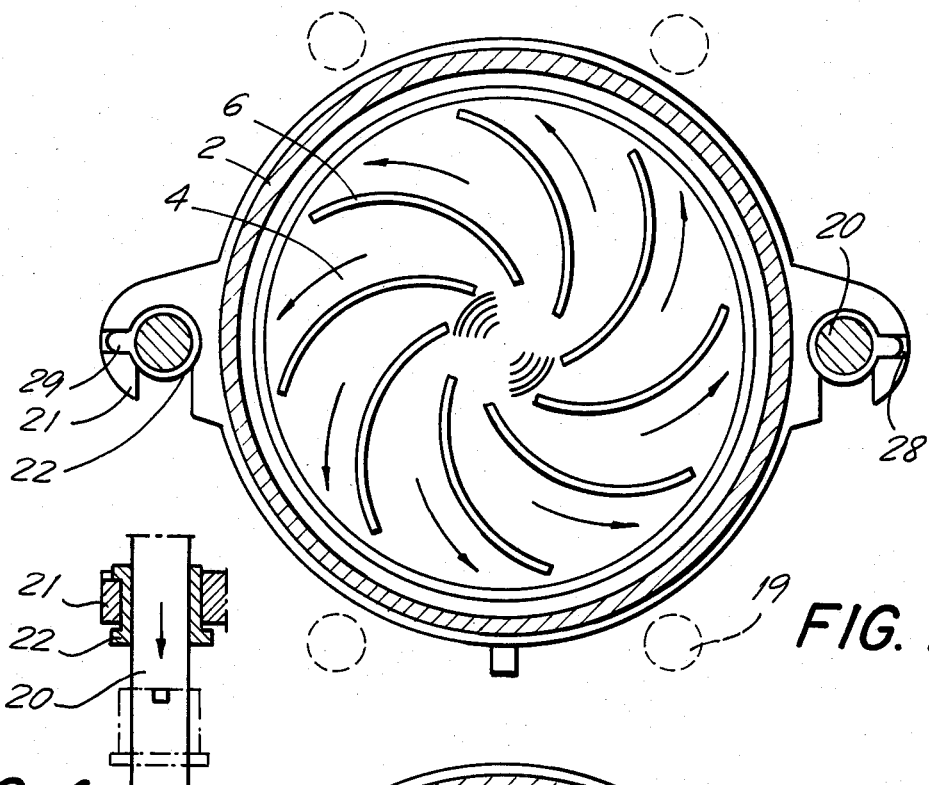
FIG. 2
FIG. 4
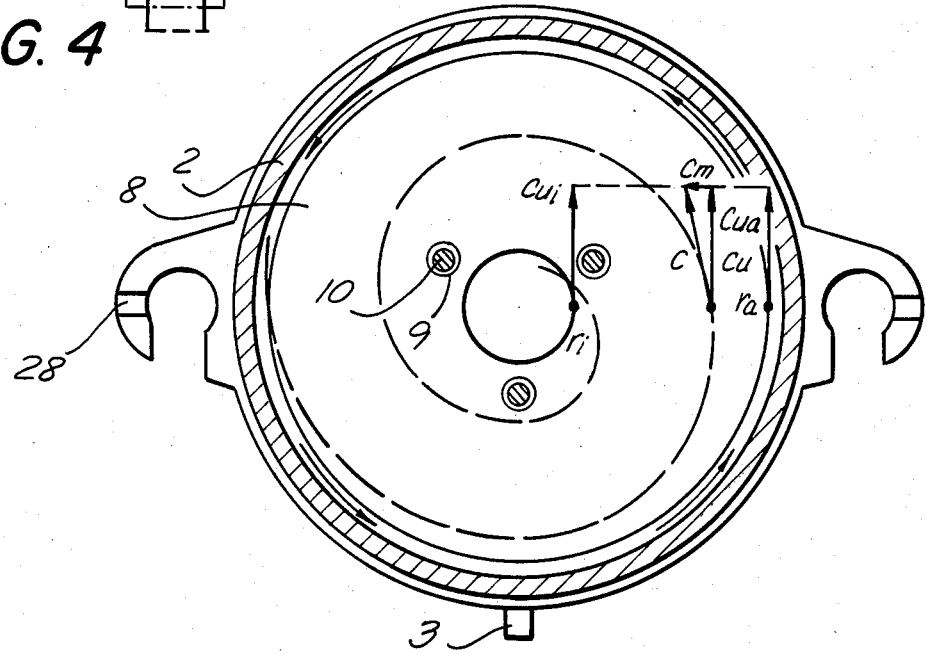
FIG. 3

FLAT-MEMBRANE SEPARATING ARRANGEMENT

CROSS-REFERENCE TO RELATED APPLICATIONS

This application is a continuation-in-part application of my copending application Ser. No. 451,543, filed Dec. 21, 1982 and entitled Flat Membrane Separating Device, now abandoned.

BACKGROUND OF THE INVENTION

The present invention relates to a flat-membrane separating arrangement which can be used in such processes as ultrafiltration, reverse osmosis, and the like, for separating dissolved and also partially suspended substances from pure or colloidal solutions.

Flat-membrane separating arrangements of the above mentioned general type are known in the art. This arrangement has in general different means which produce a liquid flow on the upper surfaces of the membranes, and wherein the process-blocking cover layers of the membranes are prevented and excessive concentrations in the vicinity of the membrane are continuously decreased. In many known flat-membrane separating arrangements, the depolarization liquid is passed through differently shaped narrow gaps. Another solution is also known, which eliminates the disadvantages of the gap depolarization and wherein circulating membrane elements, such as rotatable disks, or partially rotatable disks, or a completely rotatable arrangement, are taken into consideration. Further solutions include one-chamber experimental cells in which stirrers, vibramixers and tangentially arranged nozzles are used for spin generation. With acceptance of the spin depolarization these elements cannot, however, lead to the known industrially used multi-chamber separating arrangements. The ultrafiltration arrangement is a first solution in which the features of the spin cell are combined in a separating arrangement with several superposed chambers. The press-like assembled chambers are brought into a pressure container which is charged with the aid of pressure air and/or rotary pump with the solution to be separated, so that the nozzle-like inlet passages of the spin ring, arranged in the plate packet, do not need separate supply conduits. This solution is disadvantageous in that it transmits the principle of the spin cell so that the spin flow is carried out by nozzles. As a result of this, considerable loading takes place in the vicinity of the nozzles and leads to destruction of the separation-active layer of the membrane and thereby to premature stoppage of the operation. Further disadvantages of this solution is that the spin depolarization provides considerable advantages as compared with other principles only when certain conditions are completely satisfied, which can be realized with one or several nozzles in each chamber only to a limited extent. This is disclosed in the East German patent application No. DD-WP 114,205. During the generation of a spin flow with the aid of nozzles, an unfavorable cross-sectional ratio of the nozzle opening and the spinning chamber takes place, so that a considerably greater speed is produced in the nozzle as compared with the circumferential component at the outer edge of the spin chamber. Thereby high friction losses and further considerable energy losses take place so that at the location of the flow unification in the vicinity of the nozzle the speed difference is considerably nullified. A further considerable reduction of the circumferential component is also caused because the spin flow requires a meridian component which can occur at the outer edge of the spin chamber with the tangential cross section expansion, so that with increased distance from the nozzle it respectively reduces and thereby the edge conditions of the spin flow are worsened. These disadvantages as a whole are not eliminated in the arrangement including several nozzles in each chamber, inasmuch as the speed differences at the outer edge can be reduced, however at the same cross section the circulating quantity is reduced proportionally to a reduced diameter of the nozzle and the solid-material-loading capacity of the separating arrangement is still considerably reduced.

SUMMARY OF THE INVENTION

Accordingly, it is an object of the present invention to provide a flat-membrane separating arrangement which avoids the disadvantages of the prior art.

More particularly, it is an object of the present invention to provide a flat-membrane separating arrangement which eliminates the above mentioned disadvantages with simple means and provides a favorable ratio of the separating output and energy consumption, an increased load capacity with solid material, and low-cost maintenance.

In keeping with these objects and with others which will become apparent hereinafter, one feature of the present invention resides, briefly stated, in a flat-membrane separating arrangement which is subdivided into a plurality of blocks or chambers separated from one another by identical separating plates and annular members and connected with one another by tie rods, so that an arrangement in series is provided and the chambers communicate with one another through central openings in the separating plates, and each chamber is provided at its inlet side with a guiding device and a plurality of membrane-coated ring-shaped filter disks arranged thereafter.

When the arrangement is designed in accordance with the invention, it provides high separating effect by widely variable and at the same time locally approximately equalized spin flow, so that both high loss energy peaks and underdepolarized surface portions and also local overloading of the membranes are eliminated. The means for a spin generation is changed so that, in comparison with the used nozzles, both a further reduction of the energy loss and a greater insensitivity to solid material loading are provided. Thereby not only an approximately equalized edge flow must be attained, but also due to the design of the separating arrangement according to the invention the effects of corriolis and centrifugal forces and the liquid friction are considered wherein substantial speed stability is ensured and a turbulence, acting over the entire surface with small circulating quantities, occurs. A further decrease of the energy consumption is obtained because the radial pressure differential relative to a spin flow with $c_u r = $ constant is considerably reduced. The inventive blocks can be assembled in a flat-membrane separating arrangement of considerable dimensions. The specific circulating quantity, required for depolarization, is reduced, and favorable conditions for localizing and exchanging of defective membranes are provided.

The guiding device located upstream or at the inlet side of the packet of filter disks can include a delfecting disk which is not drilled in the center and has a smaller diameter than the ring-shaped wall, a rotation-symmetrical, central raised portion arranged at the inlet side of the deflecting disk, and a plurality of radial guiding blades curved in one plane at the same side. The guiding blades are limited at the inlet side of the chamber, either by a separating plate or a cover disk provided with a central opening and used for compensation of manufacturing tolerances, and also limited at the opposite side by the above mentioned deflecting disk.

The packet of filter disks which is advantageously connected with the guiding device, is arranged in a functionally correct position relative to the guiding device, wherein preferably three spacing rings are inserted between each filter disk pair which rings define with their height a gap, which is open at inner and outer edges of the disks. The position of the spacing rings is provided in correspondence with the openings which remain in the vicinity of the inner edges of the filter disks. Tensioning and permeate-guiding pins which are advantageously provided with grooves or flattened in the longitudinal direction extend through the openings of the filter disks and the spacing rings and tightly clamp the filter disks and the spacing rings together, the pins being connected with the separating plate which limits the chamber. Via the groove or flattenings formed in the tightening and permeate/guiding pins a liquid connection takes place between the porous material, embedded in the membranes and the filter disks, the annular groove which remains between the separating plate and an additional cover plate, an opening radially extending in the separating plate, and a permeate-withdrawing pipe of each chamber. The reduction of the throughflow cross section of the porous material, produced in the region of the spacing rings by the tensioning pressure with the aid of pressing plates, inserted in the eccentric openings of the filter disks in pairs, is compensated in that the pressing plates have a greater diameter than the spacing rings and are formed liquid-permeable outside of the abutment region of the spacing rings, by means of vertical openings, and placed in the filter disks and/or formed at the inner end side of the plates so that a hollow space connected with the porous material and the longitudinal grooves or flattenings of the tensioning and permeate/guiding pins, is formed.

A further feature of the present invention is embodied in means for sealing the connection of the membranes with the circular ring-shaped filter disks at inner and outer edges of the latter. This connection is performed without high expenditures, it can be released and used again, and can be provided without the reduction of the gap cross section at the edges of the filter disks. The construction at the outer edge includes a first tensioning ring with one portion which covers a small width of a membrane edge and a substantially conical other portion extending over the thickness of the filter disk radially inwardly, a second tensioning ring arranged at the opposite side of the same filter disk and also having one portion and another inclined portion, and a locking ring located between the tensioning ring and the filter disks so as to urge the tensioning disks to clamp together the filter disk with two membranes and two sealing elements. The locking ring can be endless and arranged so as to engage in a recess of the tensioning ring. The construction at the inner edge of the filter disks is substantially similar to the construction at the outer edge; the only difference is that the construction is modified in correspondence with the central opening at the inner edge.

Still a further feature of the present invention is that the tie rods connect the blocks with one another in a releasable manner, and more particularly the separating plate is provided with two guiding pieces at the two sides, each having a laterally open slot coaxial with the respective tie rod and a notch each having a small axial gap, and there are two arresting rings with a projection and being insertable in each of the slots between the respective guiding piece and the tie rod so that each arresting ring is turnable between an arresting position in which the projection of the arresting ring engages in the notch of the guiding piece and arrests the latter, and a releasing position, in which the arresting ring conforms with the slot of the respective guiding piece and can be displaced axially outwardly of the latter to allow for a lateral displacement and disconnection of the respective guiding piece of the separating plate from the respective tie rod.

The raw solution to be separated is supplied under a positive pressure into the flat-membrane separating arrangement so that a moving force for the liquid flow through the membrane is available. The dissolved substance is retained by the membranes, whereas a solvent which is permeate flows into the porous material embedded between the membranes and the filter disks and then flows in the direction of the liquid permeable pressing plates in the filter disks outside the spacing rings, so that it accumulates in a hollow space formed between a pair of the plates, and from there travels in the grooves or flattenings of the tensioning- and permeate-guiding pins to the annular groove remaining between the separating and cover plates. With the liquid guiding system as well as with the radial opening arranged in each separating plate between the permeate withdrawing pipe and the annular groove, the packet of disks of each chamber acts as a separate permeate drain.

The above described separating process can, however, be effectively maintained when the strongly process-inhibiting separated phase concentrated on the upper surface of the membrane is actively depolarized. In accordance with the invention, the raw solution is supplied by a circulating pump axially into the opening of the first chamber of the flat-membrane separating device, where it first deviates by the inlet projection radially outwardly and then is tangentially deviated with the aid of the guiding blades, so that in the annular space formed by the annular part and the packet of the filter disks a circumferential component, determined by the outlet angle of the guiding blades and the circulating quantity, is generated. This speed component is superposed by a meridian component resulting from the supply flow, so that a radially inwardly directed partial flow is pressed through the depolarization gaps formed between the filter disks. Thereby the radial movement produces tangential acceleration forces with which an equivalent to the oppositely directed friction forces is obtained so that the value of the outer circumferential speed attained with the aid of the guiding device is maintained close over the entire disk surface, until the liquid reaches the inner passage formed by the openings of the filter disks in which the liquid flows axially to the next chamber of the flat-membrane separating arrangement.

A further effect which is used in the inventive arrangement is that the flow conditions are produced at different differential pressure in the depolarization gaps of the packet of the filter disks, so that the outer circumferential component, which damps because of the friction with increased distance from the guiding device, is compensated by a respectively increased radial partial stream, whereby it is possible to provide a correct number of the filter disks per each chamber in accordance with the flat-membrane separating arrangement, so that an identical separating effect in each chamber would be obtained.

The same results are obtained in each chamber with lower pressure losses from chamber to chamber, so that the inventive elements can be assembled so as to form flat-membrane separating arrangements, in which the raw solution of the concentrate with a comparatively low pressure drop is supplied from the last chamber to the circulating pump, so that here also a favorable ratio between the circulating quantity and the pressure drop is attained.

The novel features which are considered characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

FIG. 2 is a cross section of the flat-membrane separating arrangement at the location of guiding blades of a guiding device;

FIG. 3 is a cross section of the flat-membrane separating arrangement at the location of a depolarization gap limited by filter disks;

FIG. 4 is a longitudinal section through one guiding piece arranged on a separating plate, with an arresting ring inserted therein;

DESCRIPTION OF THE PREFERRED EMBODIMENTS

Figure 1:
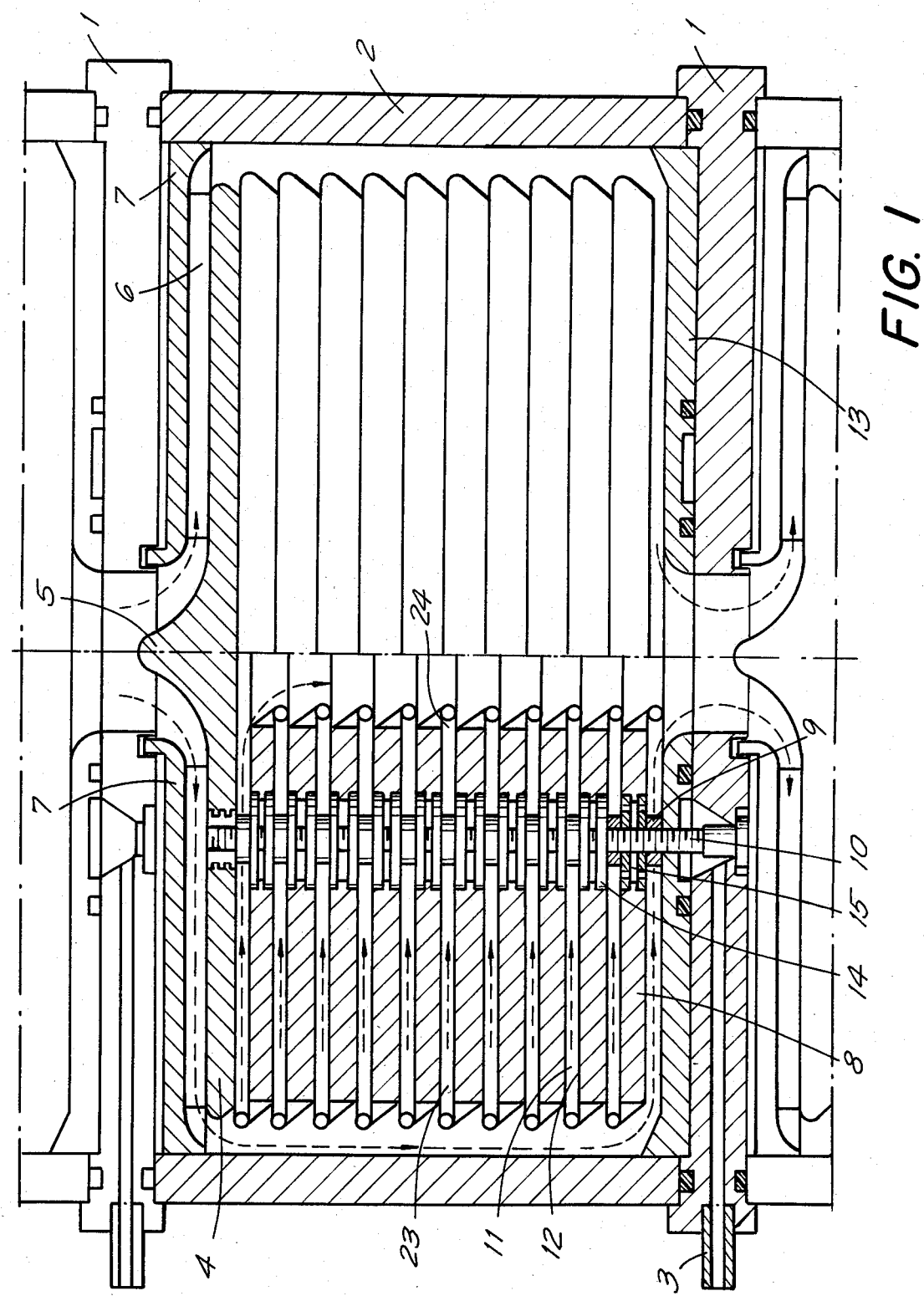
FIG. 1 is a longitudinal section of a single block of a flat-membrane separating arrangement in accordance with the present invention.

A separating arrangement with flat membranes is assembled, for example, with the aid of a tie rod so that it can have different dimensions, and includes a plurality of modules arranged in series. FIG. 1 shows a longitudinal section of the inventive arrangement in which elements belonging to one module are identified with uninterrupted lines and hatching. The module has a chamber which is provided at its inlet side with a guiding device, and also provided with a packet of filter disks arranged after the guiding device.

In the embodiment shown in FIG. 1, the chamber of the module is formed by a separating flange 1 and an annular part 2. Thus the module, after the assembly of the same, is covered at its inlet side by the separating flange 1 of the preceding module. The chamber of the first module of the arrangement having several modules, as well as the chamber of the arrangement having only one chamber, is closed at its inlet side by an additional permeate-side closed separately plate 1 and/or a tightening plate which is pressed by a tie rod 19, 20 (FIG. 2) and is not shown in the drawing. It can, however, be advantageous when the separating plate 1 and the annular part 2 are of one piece with one another. In this case, for covering the first chamber, the tensioning plate has a design which is partially analogous to the design of the separating plate 1.

In the advantageous embodiment of FIG. 1, both the guiding device and the filter disks 8 of one module are tensioned with the aid of three tensioning and permeate-guiding pins 10 which are slotted in a longitudinal direction. They also fix the module to the respective separating plate 1. Preliminarily inserted three spacer rings 9 are arranged between each pair of disks. Thereby, open gaps 23 and 24 are formed at the outer and inner edge of the disks in correspondence with the height of the spacing rings. The filter disks 8 are coated in a known manner with membranes 11, and a layer of porous material 12 is embedded between the membrane and the filter disks. The edges of the membranes 11 and the filter disks 8 are sealingly connected with one another with the aid of the inventive tensioning assembly shown in FIGS. 5 and 6.

As a result of this, each module of the separating device has two liquid chambers which are separated from one another. The permeate chamber is formed by the pores of the porous material 12, openings of pressing plates 14 inserted in the region of the spacing rings 9 in the filter disks 8 for compensation for the tensioning pressure, a hollow space 15 enclosed between two pressure plates 14, the grooves of the tensioning and permeate-guiding pins 10, an annular groove which remains between a cover plate 13 and the separating plate 1, three conical openings provided in the separating plate 1, and a radial opening connected with one conical opening with inserted permeate-withdrawing pipe 3. Since the raw solution and concentrate chamber is connected via the central openings of the separating plate 1 with the other modules, the inventive arrangement guarantees for each module a separate permeate withdrawal, which allows to localize in block-type manner the membrane defects, so that in the event of failure only the respective module needs to be exchanged to be easily regenerated during intermediate time periods.

The guiding device which is screwed at the raw solution or concentrate inlet with the packet of the filter disks includes an inlet projection 5, a deviating disk 4 and guiding blades 6. It functions in a proper way when the guiding blades 6 are exactly laterally aligned with the end side of the annular part 2. In the embodiment shown in FIG. 1, however, the inlet-side covering of the guiding blades 6 is provided by a special cover disk 7. To facilitate the manufacture, the guiding device, produced of plastic, is formed not as a solid piece, but instead is provided with the separate cover disks 7. Then, however, non shown elastic pressing rings are inserted between the separating plate 1 and the cover disk 7 in FIG. 1. In the event of small circulating quantities the tensioning and permeate-guiding pins 10 can also extend through the guiding blades which are thicker at these locations, to the cover disk 7.

FIG. 2 shows a cross section of the separating device with flat membranes or its module at the location of the guiding blades 6, as seen in the direction toward the inlet projection 5. The concentrate which flows into the module from above, as considered in this Figure, is tangentially accelerated with a radial outward deviation by variably deformable guiding blades 6. In the shown embodiment, the guiding blades have the shape of circular arcs. It is advantageous when each guiding blade 6 is provided with such a curvature which is not constant over the entire length of the blade. Contrary to the shown embodiment, when the module has a greater diameter additional shorter intermediate blades can also be arranged to improve the guidance of the liquid at the outer edge of the guiding device. A completely equilized twisted stream produced at the outlet of the guiding device is deflected by the cover disk 7 in the direction toward the packet of filter disks.

FIG. 3, which is a section of the module at the location of a depolarization gap between the filter disks 8, shows a speed picture resulting the inventive construction. It is obtained over the membrane surface with relatively small meridian speeds $c_m$ so that the circumferential component $c_u$ for the depolarization effect is standard. Whereas the edge components $C_{ua}$, produced in the guiding device remain the same, due to the acceleration of tangential forces over the region from $r_a$ to $r_i$, they can decrease due to the friction in the annular chamber between the annular part 2 and the filter disks 8 with an increased distance from the guiding device. Simultaneously with this change, however, also change the pressure components from one filter disk 8 to the other, so that the speed decrease in the annular chamber is compensated for by an increasing partial flow quantity in each filter disk gap, whereby the acceleration of tangential forces increases. The module is dimensioned so that the speed picture shown in FIG. 3 takes place in the central region of the packet of filter disks. In the first depolarization gap, the greater circumferential component $c_{ua}$ is compensated for by a smaller value $c_{ui}$, and in the last disk of the packet the smaller circumferential speed $c_{ua}$ is compensated for by the greater value $c_{ui}$, so that for a sufficient number of the filter disks each module provides a substantially uniform separating effect.

FIG. 4 shows a partial longitudinal section through a guiding pin 21 formed on the separating plate 1 with an inserted arresting ring 22 which provides at this location a full axial guidance of the module required during the vertical installation of the latter. The arrangement guarantees that in the event of failure the respective module can be easily withdrawn from the separating arrangement and no modules, located above the same are to be axially removed through the tie rod 20. The release of this guidance is performed by turning the arresting ring 22 until the projection 29, arranged at one side, coincides with the slot of the guiding pin 21, and the arresting ring 22 can be withdrawn from the slot of the guiding pin 21 axially.

In the construction shown in FIG. 4 and providing for the insertion of the arresting ring 22 from below, the guide is secured additionally with the aid of a notch 28 provided in the guiding pin 21 so that the projection 29 of the arresting ring 22 engages in the notch 28 after the insertion and turning. For a further securing, an elastic intermediate member is provided between the bead of the arresting ring 22 and the guiding pin 21, formed, for example as a soft rubber ring.

Figure 6:
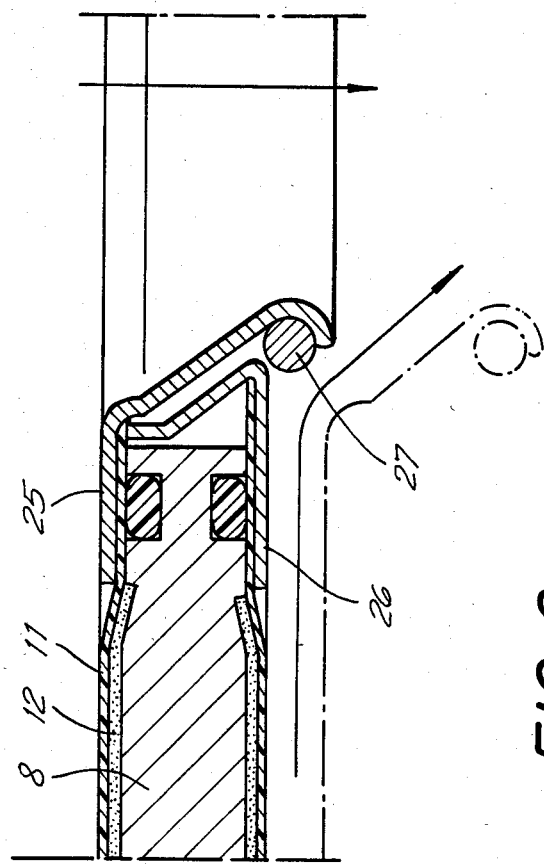
FIG. 6 is a partial section of a filter disk, having a clamping device at its inner edge, of the inventive flat-membrane separating arrangement.
Figure 5:
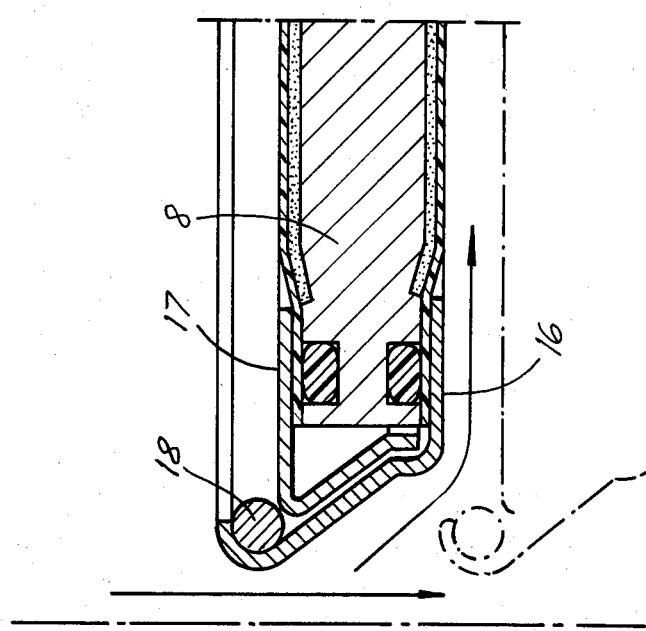
FIG. 5 is a view showing a partial cross section of a filter disk, having a clamping device at its outer edge, of the inventive flat-membrane separating arrangement.

FIGS. 5 and 6 illustrate an example of the embodiment of the tightening assembly in accordance with the present invention, wherein the membranes are tightly connected both with the outer edges and with the inner edge of the filter disks.

The membranes 11, the porous material 12 and the filter disk 8 are centrally inserted into a tensioning ring 16. Covering of the upper membrane 11 is performed by a clamping ring 17 which is pressed with the aid of the pressing plates of the arrangement against the seals of the filter disk until the sealing flange of the tensioning ring 16 and the clamping ring 17, as well as the edges of the membranes 11, tightly abut against the filter disk 8. After the removal of the pressing disks the locking ring 18 inserted into tension ring 16 locks it in position with a minimal backspring action, and the ring 18 is clamped by pressure of the deformed seals as shown in FIGS. 5 and 6 or within the tensioning ring 16.

The inner edge of the filter disk 8 is tightened in the same manner with the aid of a tensioning ring 25, a clamping ring 26, and an arresting ring 27. Under certain circumstances, it is advantageously, for example in the event of the membranes having a thick composite layer, to provide, instead of the round ring corresponding to FIGS. 5 and 6, endless seals with a U-shaped profile, so that the edges of the disks can be completely embraced by the sealing material. In addition to the fact that this tensioning device can be produced without high expenditures, released and repeatedly utilized, it is also the advantage of the inventive construction that the respective parts are manufactured of a thin material, thereby the depolarization gap 23 and 24 at the edges of the filter disks 8 are not reduced despite the fact that relatively thin filter disks 8 are utilized which allows for only a limited thickness decrease at the tightening locations. The conical portions of the tensioning ring 16 and 25 which increase the moment of resistance, can in addition be used for improving flow conditions, inasmuch as their shape improves the conditions of the separation and uniting of the flow.

Contrary to the embodiments shown in FIGS. 5 and 6, it is advantageous to utilize the locking rings with a respective profile which does not have a circular cross section and produces an uninterrupted contour between the radial hollow of the tensioning rings 16 and 25 to the clamping rings 17 and 26. By endless locking rings the gaps between the tensioning rings 16 and 25 and the clamping rings 17 and 26 can be completely closed. To ensure a considerably smaller elasticity in the transverse direction relative to the seals, the insertion or formation of steel spirals can be provided.

It will be understood that each of the elements described above, or two or more together, may also find a useful application in other types of constructions differing from the types described above.

While the invention has been illustrated and described as embodied in a separating arrangement with flat membranes, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A flat-membrane separating arrangement for the separation of pure or colloidal dissolved and partially suspended substances, comprising a plurality of separating module blocks each having an axis and including a filter container means, a packet of ring-shaped membrane-coated filter discs positioned in said filter container means and spaced from one another in an axial direction so as to form therebetween intermediate gaps which are peripherally open, means for connecting said filter discs in said packet and including a plurality of spacing rings located between said filter discs to retain the latter in spaced relationship relative to one another, and a plurality of tensioning and permeate-guiding pins connecting said filter discs with one another, means for supplying a raw solution—or concentrate into said filter container means and positioned upstream of said packet of filter discs, means for guiding said raw solution or concentrate in said filter container means and including a plurality of curved guiding blades and a deflecting disc having a central projection and positioned upstream of said packet, said filter container means including an annular wall extending along the length of said packet and being peripherally spaced from said packet so as to form therewith a peripheral annular gap extending over the entire length of said packet and communicating with said intermediate gaps, and at least one circular separating plate positioned upstream of said reflecting disc and having a central opening forming said supplying means; and permeate withdrawing means downstream of said packet and including a radially extending permeate withdrawal opening, each of said module blocks being releasably connectable with a neighboring block so as to assemble a plurality of said blocks into the multi-module arrangement in which the blocks are connected in series, whereby the raw solution or concentrate is admitted into the central opening of a first block in said arrangement, then passes all the blocks of said arrangement one after another and is discharged from a last block in said arrangement, whereas the permeate can be discharged and thus controlled from any module block in said arrangement.

2. A flat-membrane separating arrangement as defined in claim 1, wherein said separating plate separates one block upstream of the latter from a neighboring block in said arrangement.

3. A flat-membrane separating arrangement as defined in claim 1, wherein said tensioning and permeate-guiding pins are arranged so as to also connect said filter discs of said packet with said guiding means and are positioned eccentrically of said central opening.

4. A flat-membrane separating arrangement as defined in claim 1; and further comprising a further separating plate arranged to separate one block downstream of the latter from a neighboring block, said permeate-withdrawing means including a ring-shaped cover plate arranged on said further separating plate.

5. A flat-membrane separating arrangement as defined in claim 1, wherein each of said filter discs has a ring-shaped body part having radially an inner edge and an outer edge and two axially spaced surfaces defining a body part thickness therebetween, two membranes each arranged on a respective one of said surfaces of said body parts, two sealing members each arranged between one of said membranes and the respective surface of said body part, and first means for fixing said membranes at said inner edge and second means for fixing said membranes at said outer edge of said body part, said second means for fixing said membranes at said outer edge of said body part including a first tensioning ring having one portion extending radially at one side of said body part and another portion which is inclined and extends over the thickness of said body part, a second tensioning ring having one portion extending radially at another side of said body part and another portion which is inclined and extends over the thickness of said body part radially inwardly of said another inclined portion of said first tensioning ring, and a locking ring insertable between said first and second tensioning rings with compression of said sealing members, whereby the one portions of said tensioning rings clamp therebetween said body part with said membranes at said outer edge of said body part.

6. A flat-membrane separating arrangement as defined in claim 5, wherein said first means for fixing said membranes at said inner edge of said body part includes a further first tensioning ring having portions extending radially at one side of said body part and another portion which is inclined and extends over the thickness of said body part, a further second tensioning ring having one portion extending radially at another side of said body part and another portion which is inclined and extends over the thickness of said body part radially inwardly of said another inclined portion of said further first tensioning ring, and a locking ring insertable between said further first and second tensioning rings with compression of said sealing members, whereby the one portions of said further tensioning rings clamp therebetween said body part with said membranes at said inner edge of said body part.

7. A flat-membrane separating arrangement as defined in claim 5, wherein said another portions of said tensioning rings of said second means for fixing said membranes on said outer edge of said body part are substantially conical.

8. A flat-membrane separating arrangement as defined in claim 5, wherein said first tensioning ring of said second means for fixing said membranes on said outer edge of said body part has a recess, said locking ring being insertable into said recess of said first tensioning ring.

9. A flat-membrane separating arrangement as defined in claim 8, wherein said locking ring is endless and is shaped so as to be insertable into said recess of said first tensioning ring.

* * * * *